United States Patent [19]

Shigeta et al.

[11] Patent Number: 5,467,216
[45] Date of Patent: Nov. 14, 1995

[54] SPATIAL LIGHT MODULATION DEVICE

[75] Inventors: Masanobu Shigeta; Dai Imanishi, both of Yokosuka; Shigeo Shimizu, Yokohama, all of Japan

[73] Assignee: Victor Company of Japan, Ltd., Yokohama, Japan

[21] Appl. No.: 188,982

[22] Filed: Jan. 31, 1994

[30] Foreign Application Priority Data

Jan. 29, 1993 [JP] Japan ................... 5-034945

[51] Int. Cl.$^6$ ............ G02F 1/03; G02F 1/1335; G02F 1/135
[52] U.S. Cl. ............ 359/263; 359/67; 359/71; 359/72; 359/584
[58] Field of Search ............ 359/67, 263, 71, 359/568, 72, 586, 247, 584

[56] References Cited

U.S. PATENT DOCUMENTS

| | | | |
|---|---|---|---|
| 4,309,075 | 1/1982 | Apfel | 359/586 |
| 5,084,777 | 1/1992 | Slobodin | 359/67 |
| 5,272,554 | 12/1993 | Ji et al. | 359/67 |

FOREIGN PATENT DOCUMENTS

| | | |
|---|---|---|
| 3217825 | 9/1991 | Japan . |
| 667196 | 3/1994 | Japan . |

OTHER PUBLICATIONS

"Full–Color Single–Projection–Lens Liquid–Crystal Light–Valve Projector" by Arno G. Ledebuhr; SID 86 Digest; 1986; pp. 379–382.

Primary Examiner—Paul M. Dzierzynski
Assistant Examiner—Audrey Chang
Attorney, Agent, or Firm—Lowe, Price, LeBlanc & Becker

[57] ABSTRACT

A spatial light modulation device of the type, in which information is written to a photoconductor by a light writing portion and read light impinging on a light modulator is reflected by a reflection portion. This spatial light modulation device is provided with a dielectric mirror mounted on a reflection surface of the photoconductor, which surface is opposed to the other surface on which write light is incident. The reflection surface of the photoconductor reflects lights having wavelengths near a wavelength at which the photoconductor has a maximum sensitivity. Thereby, the spatial light modulation device can have a high sensitivity.

6 Claims, 6 Drawing Sheets

| | THICKNESS OF PHOTOCONDUCTOR ($\mu m$) | RESOLUTION ($\mu m$) | CONTRAST RATIO |
|---|---|---|---|
| 1ST EMBODIMENT | 20 | 8 | 100 : 1 |
| 2ND EMBODIMENT | 20 | 8 | 100 : 1 |
| 1ST CONVENTIONAL DEVICE | 20 | 12 | 80 : 1 |
| MODIFICATION OF 1ST CONVENTIONAL DEVICE | 25 | 14 | 100 : 1 |
| 2ND CONVENTIONAL DEVICE | 20 | 8 | 40 : 1 |

SPECTRUM SENSITIVITY

SPATIAL LIGHT MODULATION DEVICE

BACKGROUND OF THE INVENTION

1. Field of The Invention

This invention generally relates to a spatial light modulation device (hereunder sometimes referred to as a spatial light modulator) and more particularly to the improvement in display quality and productivity of a liquid crystal device for use in a flat panel display, an optical arithmetic device, a video projector or the like.

2. Description of The Related Art

Generally, a spatial light modulator can perform an incoherent-light-to-coherent-light conversion, as well as a coherent-light-to-incoherent-light conversion. Thus it is considered that a spatial light modulator can be applied to a parallel processing of data and to a direct processing of image data. Further, upon condition that the intensity of light is amplified, a spatial light modulator can be applied to a display system such as a video projector.

An example of such a spatial light modulator is disclosed in SID 86 DIGEST, 1986, Society for Information Displays, pp. 379–382. FIGS. 3(A) and 3(B) illustrate the structure of this spatial light modulator. As shown in these figures, a $SiO_2$ film d, a dielectric mirror C and a light shielding film 4 are stacked on the side (hereunder referred to simply as the write-light side), on which write light is incident, of a light modulator 5 employing a liquid crystal as a modulation material. (Incidentally, the optical film thickness of the film d is $\lambda/4$ (incidentally, $\lambda$ denotes the wavelength of write light and in case of this example, $\lambda=540$ nanometers (nm)). Further, let n denote the refractive index of the film d. The thickness t of the film d is obtained by the following equation: $t=\lambda/(4n)$ ). Moreover, a photoconductor 3 is stacked on the write-light side of light shielding film 4. Furthermore, a transparent electrode 2 and a glass substrate 1 are stacked on the write-light side of the photoconductor 3.

On the other hand, a transparent electrode 6 and a glass substrate 7 are stacked on the opposite side (hereunder sometimes referred to as the read-light side), on which read light is incident, of the light modulator 5. Further, an appropriate driving power source 8 is connected to the transparent electrodes 2 and 6.

Hereinafter, an operation of such a spatial light modulator will be outlined. When write light representing desired information is incident on the photoconductor 3 of the spatial light modulator as indicated by an arrow F1, the conductivity of the conductor 3 changes according to the intensity of the write light. Thus the distribution of the conductivity of the conductor 3 corresponds to the distribution of the intensity of the write light. Therefore, a voltage supplied from the driving power source 8 is applied to the light modulator 5 correspondingly to the distribution of the conductivity, namely, to the distribution of the intensity of the write light.

On the other hand, read light is incident on the light modulator 5 as indicated by another arrow F2. However, an electric field corresponding to the distribution of the intensity of the write light affects the light modulator 5. Thus the light modulation of the read light is performed according to this distribution of the electric field. Then, the modulated read light is reflected by the dielectric mirror C and is thereafter outputted as indicated by still another arrow F3.

Incidentally, in case where a liquid crystal (for example, a liquid crystal film) having a crystal or having a support is used as the light modulator 5, a part of or all of the glass substrate is omitted. Further, the light shielding film 4 is used to prevent the read light, which passes through the dielectric mirror C, from reaching the photoconductor 3, disturbing a charge pattern and reducing the contrast between portions of the read image. Further, the light shielding film 4 is provided in the spatial light modulator, if necessary. FIGS. 4(A) and 4(B) illustrate the structure of an example of a spatial light modulator in which the light shield film is omitted.

Hereinafter, the structure of each of first and second conventional spatial light modulators, as well as methods for fabricating the first and second conventional spatial modulators, will be described in detail by referring to FIGS. 3(A), 3(B), 4(A) and 4(B). Incidentally, FIG. 3(A) illustrates the entire structure of the first conventional spatial light modulator. Further, FIG. 3(B) is an enlarged fragmentary sectional view of the first conventional spatial modulator. Moreover, FIG. 4(A) illustrates the entire structure of the second conventional spatial light modulator. Furthermore, FIG. 4(B) is an enlarged fragmentary sectional view of the second conventional spatial modulator.

In case of the first conventional spatial light modulator of FIG. 3(A), a-Si:H photoconductive film 3 having a thickness of 20 micrometers ($\mu m$), which is doped with boron (B) of 0.3 parts per million (ppm), is formed on the glass substrate 1, on which an ITO (Indium Tin Oxide) film is also formed as the transparent electrode 2, by performing a chemical vapor deposition (CVD) method. Further, the light shielding film 4 made of CdTe, which is 2 $\mu m$ in thickness, is formed on the film 3 by effecting a sputtering method. Moreover, the dielectric mirror C is formed by stacking six pairs of alternate $SiO_2$ film (c-1) and $TiO_2$ film (c-2), each of which is $\lambda/4$ (incidentally, $\lambda=540$ nm) in optical thickness, on the light shielding film 4, as shown in FIG. 3(B). Finally, a reflection film is made up by adding a $SiO_2$ film d, the optical thickness of which is $\lambda/2$, onto the top $TiO_2$ film (c-2). Incidentally, each of $SiO_2$ and $TiO_2$ films is formed by effecting what is called an oxygen ion beam assisted vaporization method. Further, the rate (hereunder sometimes referred to as the film forming rate) of forming a $SiO_2$ film and that of forming a $TiO_2$ film are 10 angstrom units/second (Å/s) and 1 Å/s, respectively. Additionally, the temperature of the substrate at the time of measuring these film forming rates is a room temperature.

Then, what is called a vertical orientating processing is performed on the glass substrate 1, on which the transparent electrode 2, the photoconductive film 3, the light shielding film 4, the dielectric mirror C and the $SiO_2$ film d are thus formed serially, and on another glass substrate 7, on which another transparent electrode (namely, an ITO film) 6 is formed. Further, these composing elements are stuck together through a spacer (not shown). Subsequently, a nematic liquid crystal such as known under a trade name "EN-38" (manufactured by Chisso Corporation) is injected into the spacer. Thus, the conventional spatial light modulator of FIG. 3(A) is completed.

In case of the second conventional spatial light modulator of FIG. 4(A), a-Si:H photoconductive film 3 having a thickness of 20 $\mu m$, which is doped with boron (B) of 0.3 ppm, is formed on the glass substrate 1, on which an ITO film is also formed as the transparent electrode 2, by performing a CVD method. Further, the dielectric mirror B is formed by stacking ten pairs of alternate $SiO_2$ film (b-1) and Si film (b-2), each of which is $\lambda/4$ (incidentally, $\lambda=540$ nm) in optical thickness, on the photoconductive film 3, as shown in FIG. 4(B). Finally, a reflection film is made by adding a SiO$_2$ film d, the optical thickness of which is $\lambda/2$ (incidentally, $\lambda$=540 nm), onto the top Si film (b-2). Incidentally, each SiO$_2$ film is formed by effecting the oxygen ion beam assisted vaporization method. Further, the film forming rate of a SiO$_2$ film is 10 Å/s. Additionally, the temperature of the substrate at the time of measuring this film forming rate is a room temperature.

Then, similarly as in case of the first conventional spatial light modulator, the second conventional spatial light modulator of FIG. 4(A) is finished by using the glass substrate 1, on which the transparent electrode 2, the photoconductive film 3, the dielectric mirror C and the SiO$_2$ film d are thus formed serially.

Meanwhile, there has been an increasing tendency in thickness of the photoconductor 3 for use in a spatial light modulator. This is due to the necessities of driving the light modulator 5 sufficiently in response to weak write light and of preventing an occurrence of loss of light, namely, preventing light from permeating (namely, passing through) the photoconductor 3. For example, the spatial light modulator disclosed in the Japanese Patent Application No. H4-335596 requires a photoconductor 3 having a thickness of 10 to 30 μm. Therefore, the film forming rate of, for instance, a-Si:H film is small (namely, several micrometers). Consequently, a time required for forming such a film reaches several hours or several tens of hours. Namely, the productivity of the conventional spatial light modulator is very low.

Moreover, in case where a conventional spatial light modulator is used in a video projector or the like, the amplification factor of intensity of light is very large in order to form a bright projection image. Further, when the sensitivity (or sensibility) of the photoconductor 3 is high as described above, leakage of read light sometimes has a bad effect upon picture quality. Especially, leaking light having a wavelength close to that of write light causes reduction in contrast ratio. Generally, a light shielding film having a sufficient thickness is introduced to the conventional spatial light modulator as a countermeasure to solve this problem. However, the introduction of such a thick light shielding film into a spatial light modulator has a drawback in that the resolution thereof is deteriorated. In case of a conventional spatial light modulator disclosed in the Japanese Patent Application Laying-open Official Gazette (Kokai Koho) No. H3-217825, a dielectric mirror made by stacking SiO$_2$ films and Si films (or Ge films), each of which is $\lambda/4$ in optical thickness, is employed therein to omit such a light shielding film. This conventional spatial light modulator, however, has a defect in that a sufficient effect may not be obtained if read light is not monochromatic radiation.

The present invention is created to eliminate the above described drawbacks of the conventional spatial light modulators.

It is, accordingly, an object of the present invention to provide a spatial light modulator which has a high sensitivity.

Further, it is another object of the present invention to provide a spatial light modulator which has a high resolution.

Furthermore, it is still another object of the present invention to provide a spatial light modulator which can serve to obtain a high contrast ratio in an output picture.

Moreover, it is yet another object of the present invention to provide a spatial light modulator which has high productivity.

SUMMARY OF THE INVENTION

To achieve the foregoing objects, in accordance with an aspect of the present invention, there is provide a spatial light modulation device of what is called a light-writing-and-reflection-reading type in which information is written to a photoconductor by light writing means and read light impinging on a light modulator is reflected by reflection means, which comprises a dielectric mirror mounted on a surface of the photoconductor, which surface is opposed to the other surface on which write light is incident, for reflecting light having a wavelength equal to that of the write light.

Further, in accordance with another aspect of the present invention, there is provided a spatial light modulation device of the light-writing-and-reflection-reading type in which information is written to a photoconductor by light writing means and read light impinging on a light modulator is reflected by reflection means, which comprises a first dielectric mirror having optical absorbency, a second dielectric mirror having a low transmittance correspondingly to wavelengths of visible light and near-infrared light, and a third dielectric mirror adjacent to the light modulator having the reflectivity to the visible light and near-infrared light.

As described above, in case of the spatial light modulation device of the present invention, a loss of a part of write light, which part is reflected by the dielectric mirror and thus permeates the photoconductor film, is reduced. As the result, the sensibility of the spatial light modulation device can be improved. Moreover unnecessary light included in read light is sufficiently absorbed into the dielectric mirror. This can alleviate undesirable influence of the unnecessary light (namely, this can prevent the unnecessary light from reaching the photoconductive film to reduce the contrast ratio). Moreover, it is unnecessary for the spatial light modulation device of the present invention to increase the thickness of the photoconductive film or layer for the purpose of increasing efficiency in utilizing write light as in case of the conventional spatial light modulation device. Furthermore, a light shielding layer for shielding read light is also unnecessary for the spatial light modulation device of the present invention, differently from the conventional spatial light modulation device. Thus the resolution of the spatial light modulation device can be improved. Further, the time required for forming the photoconductive film can be decreased. Consequently, the productivity of the spatial light modulation device can be increased.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

Figure 1A:
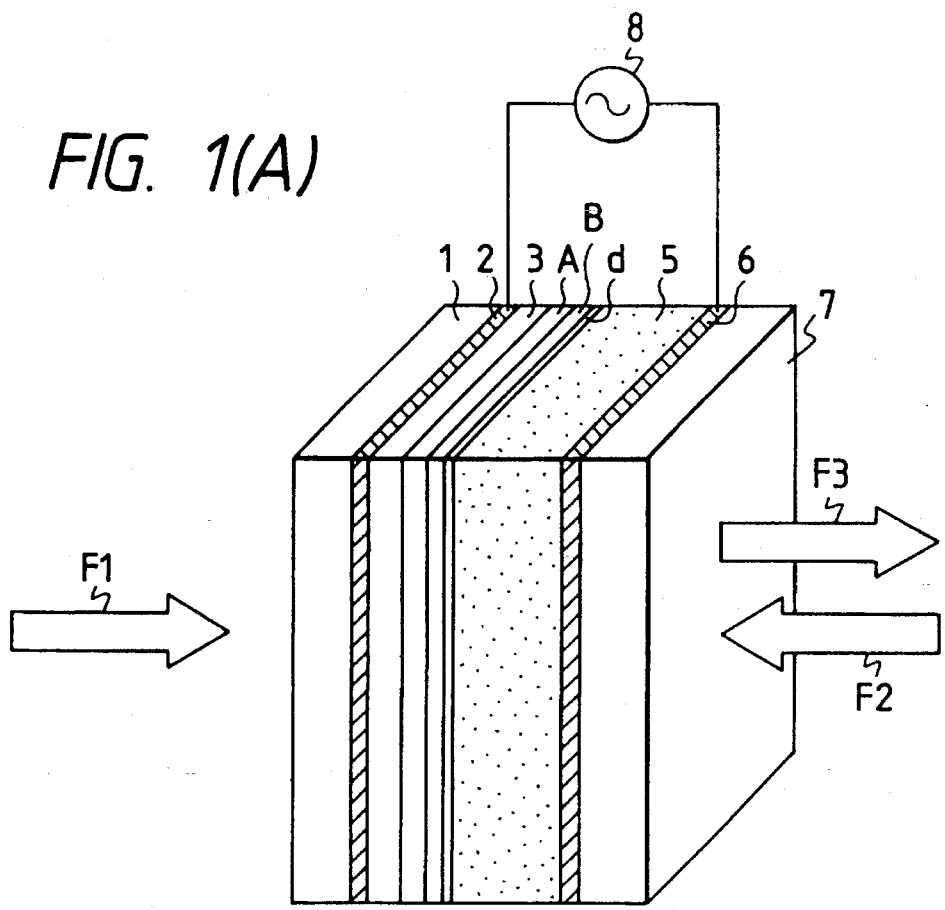
FIG. 1(A) is a diagram for illustrating the entire structure of a spatial light modulator embodying the present invention (namely, a first embodiment of the present invention)
Figure 1B:
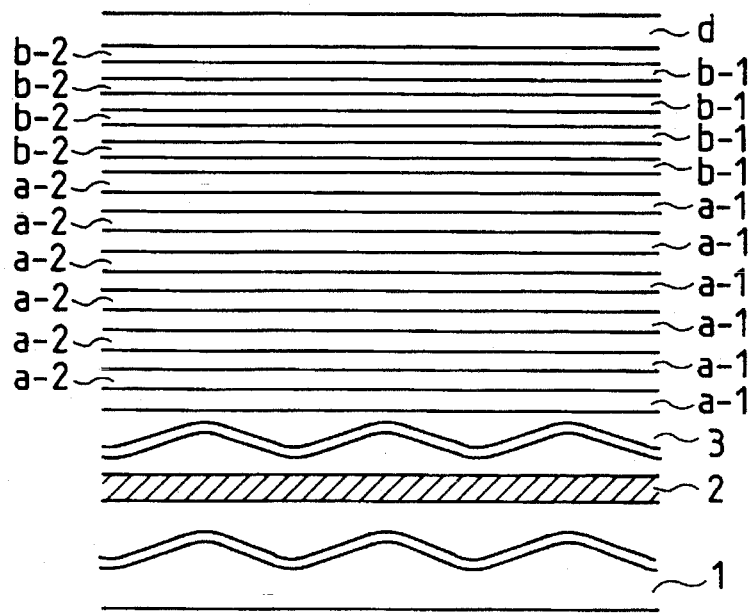
FIG. 1(B) is an enlarged fragmentary sectional view of the first embodiment of FIG. 1(A)
Figure 2A:
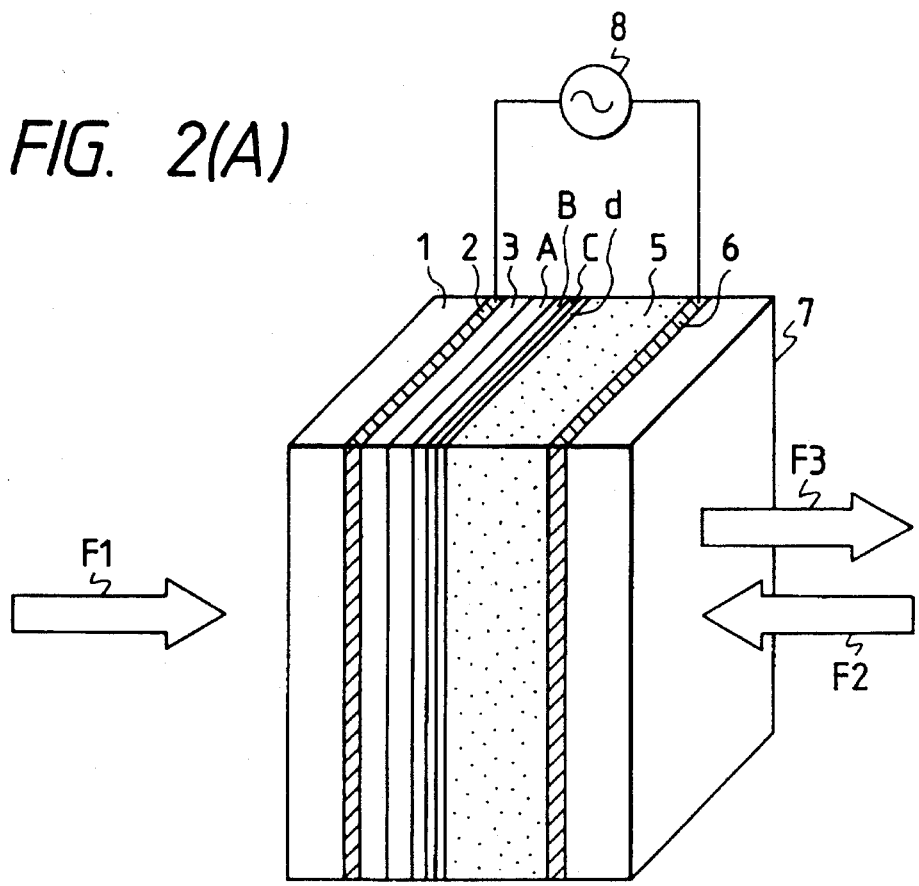
FIG. 2(A) is a diagram for illustrating the entire structure of another spatial light modulator embodying the present invention (namely, a second embodiment of the present invention)
Figure 2B:
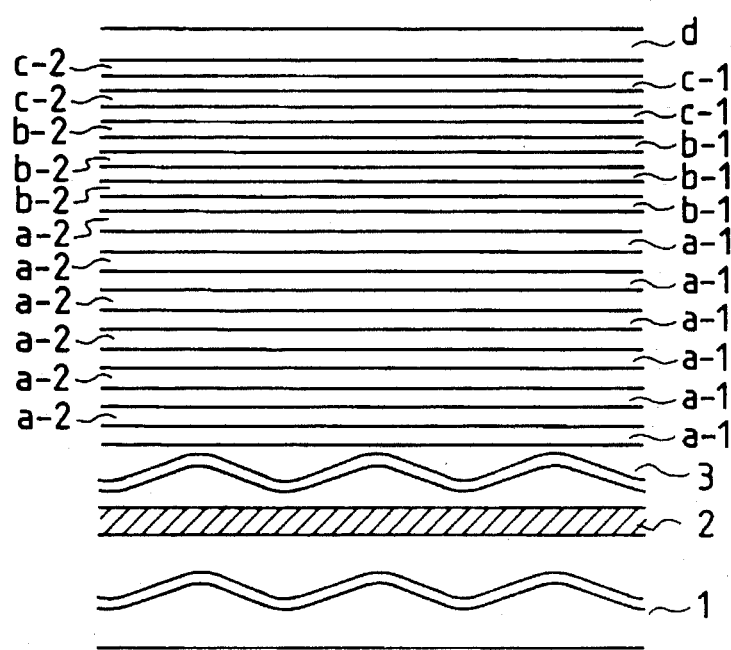
FIG. 2(B) is an enlarged fragmentary sectional view of the second embodiment of FIG. 2(A)
Figure 3A:
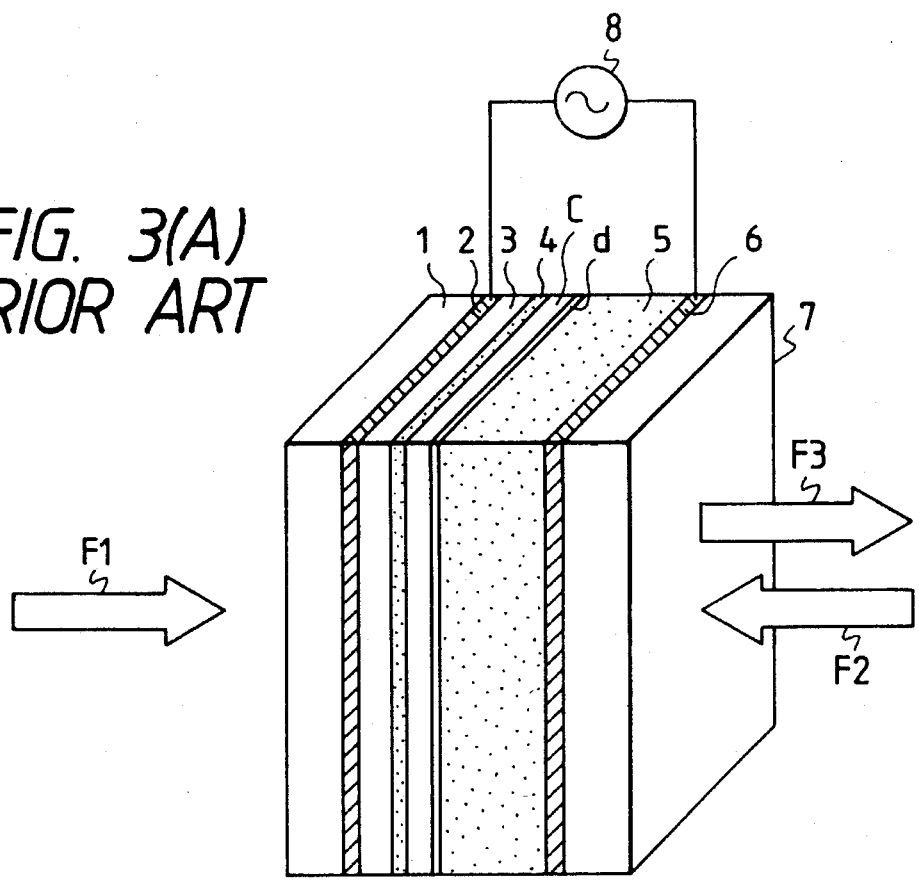
FIG. 3(A) is a diagram for illustrating the entire structure of the first conventional spatial light modulator.
Figure 3B:
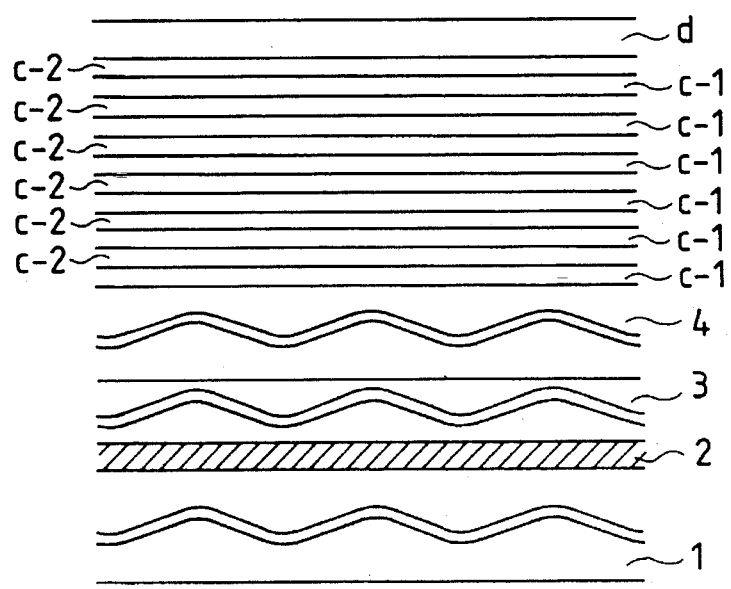
FIG. 3(B) is an enlarged fragmentary sectional view of the first conventional spatial light modulator of FIG. 3(A)
Figure 4A:
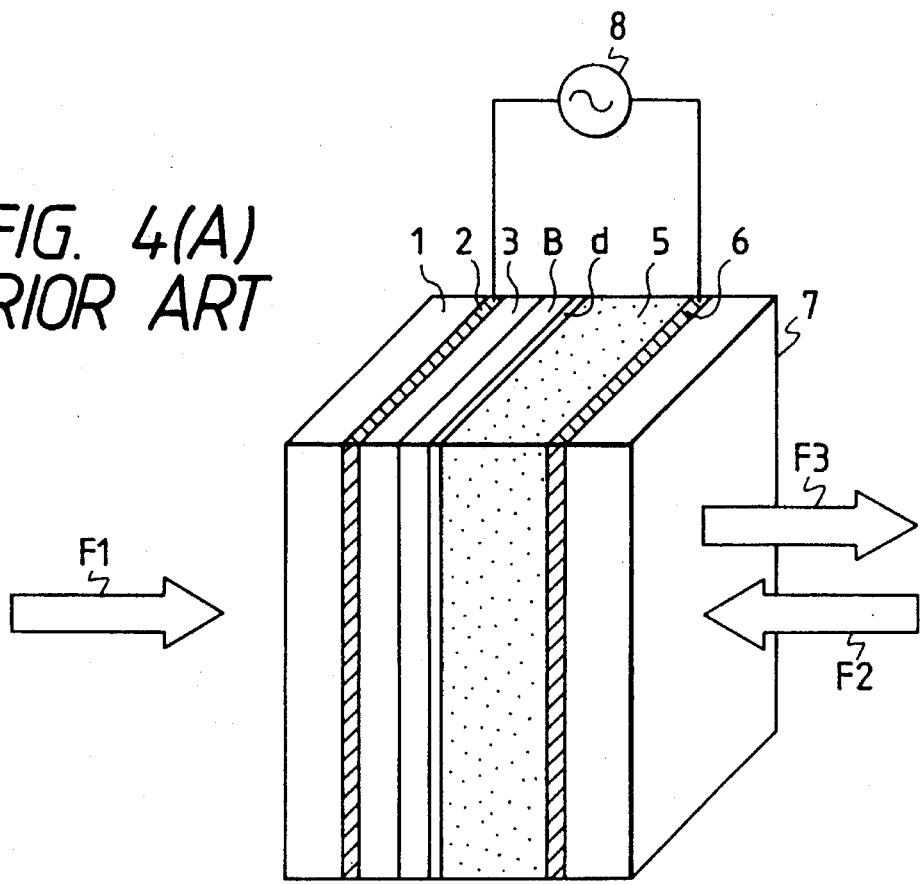
FIG. 4(A) is a diagram for illustrating the entire structure of the second conventional spatial light modulator.
Figure 4B:
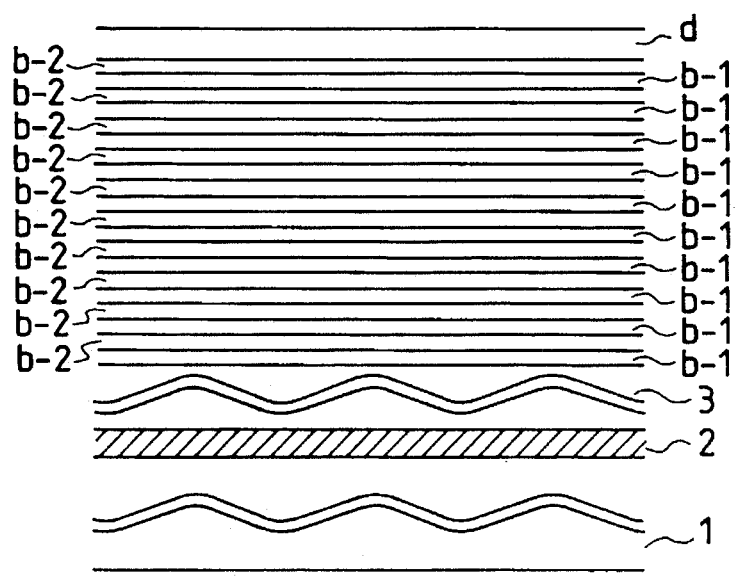
FIG. 4(B) is an enlarged fragmentary sectional view of the second conventional spatial light modulator of FIG. 4(A)

FIG. 1(A) illustrates the entire structure of a first spatial light modulator embodying the present invention (namely, the first embodiment of the present invention). FIG. 1(B) shows an enlarged fragmentary sectional view of the first embodiment of FIG. 1(A). Moreover, FIG. 2(A) illustrates the entire structure of a second spatial light modulator embodying the present invention (namely, the second embodiment of the present invention). FIG. 2(B) shows an enlarged fragmentary sectional view of the second embodiment of FIG. 2(A).

In case of the first embodiment of FIG. 1(A), a-Si:H photoconductive film 3 having a thickness of 20 μm, which is doped with boron (B) of 0.3 ppm, is first formed on the glass substrate 1, on which an ITO film is also formed as the transparent electrode 2, by performing a CVD method. Further, a dielectric mirror A is formed by stacking six pairs of alternate $SiO_2$ film (a-1) and Si film (a-2), each of which is $\lambda/4$ (incidentally, $\lambda=710$ nm) in optical thickness, on the photoconductive film 3 as illustrated in FIG. 1(B). Further, let n denote the refractive index of each of the $SiO_2$ film (a-1) and the Si film (a-2). The thickness t of each of these films is obtained by the following equation: $t=\lambda/(4n)$. Moreover, another dielectric mirror B is formed by stacking four pairs of alternate $SiO_2$ film (b-1) and Si film (b-2), each of which is $\lambda'/4$ (incidentally, $\lambda'=540$ nm), on the top Si film (a-2), as viewed in FIG. 1(B). Finally, a reflection film is made up by adding a $SiO_2$ film d, the optical thickness of which is $\lambda'/2$ (incidentally, $\lambda'=540$ nm), onto the top Si film (b-2). Incidentally, this reflection film also serves as a light shielding film. Additionally, the conditions of forming the $SiO_2$ film and the Si film are similar to those in case of the second conventional spatial light modulator.

Then, similarly as in case of the first conventional spatial light modulator, the spatial light modulator of FIG. 1(A) is finished by using the glass substrate 1, on which the transparent electrode 2, the photoconductive film 3, the dielectric mirrors A and B and the $SiO_2$ film d are thus formed serially.

Figure 5:
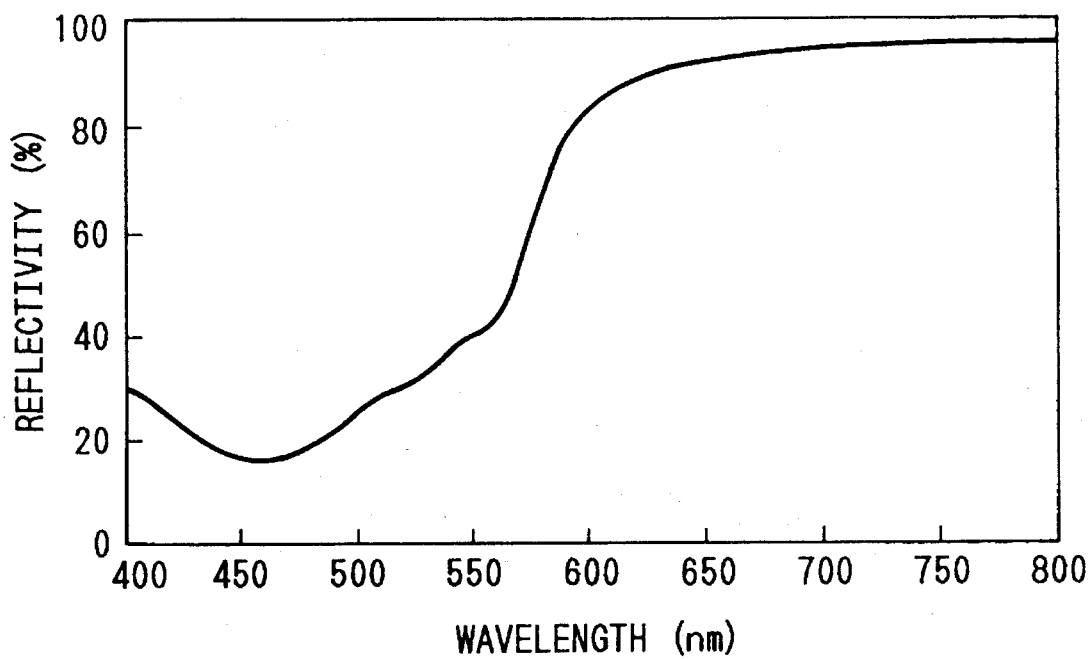
FIG. 5 is a graph for illustrating the reflection characteristics of a dielectric mirror A employed in the spatial light modulator of FIG. 1(A) (namely, the first embodiment of the present invention)

FIG. 5 shows the reflectivity characteristics of the dielectric mirror A. As can be seen from this figure, the reflectivity of the dielectric mirror A is equal to or more than 80% at the wavelength ranging from 580 nm to 800 nm. Incidentally, the reflectivity characteristics of this figure are obtained as the result of measuring the dielectric mirror A formed on the glass substrate by making light of various wavelengths impinge directly onto the dielectric mirror A in the air.

Figure 6:
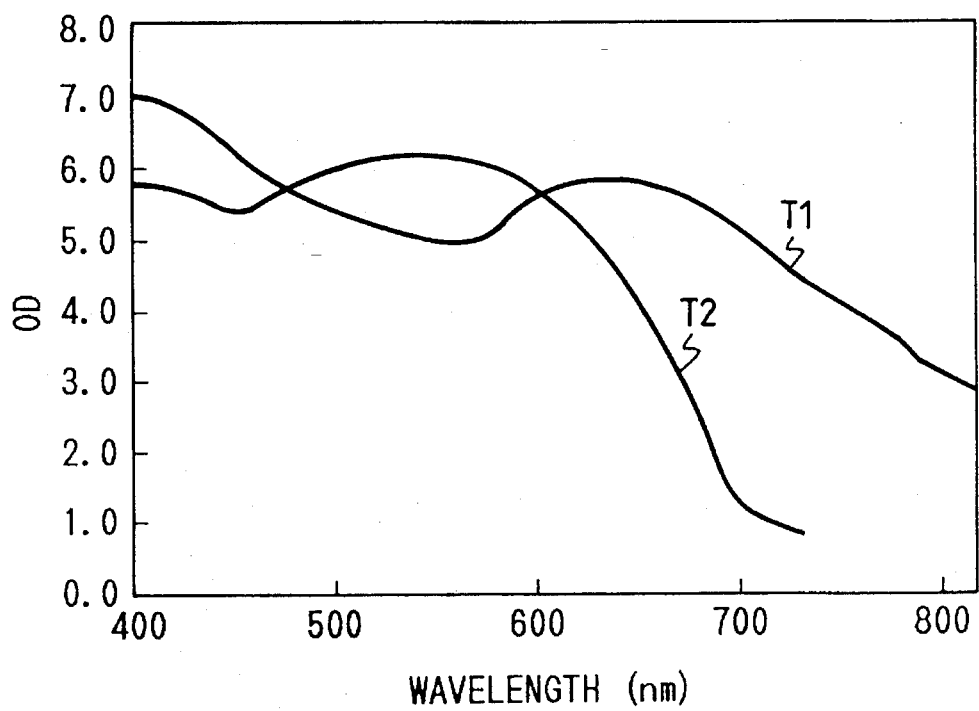
FIG. 6 is a graph for illustrating the transmissivity characteristics of the laminate composed of dielectric mirrors A and B of the first embodiment and the transmissivity characteristics of the dielectric mirror C of the first conventional spatial light modulator.

Moreover, in FIG. 6, a curve T1 indicates the transmissivity characteristics of the laminate composed of the dielectric mirrors A and B (incidentally, the vertical axis (namely, y-axis) of this graph is optical density (OD)). Further, in this figure, another curve T2 indicates the transmissivity characteristics of the dielectric mirror C of the conventional spatial light modulator. As can be seen from the comparison between the curves T1 and T2 of this figure, light having a wavelength equal to or close to 700 nm is effectively shielded by the reflection film of this embodiment, which is a laminate comprised of the dielectric mirrors A and B. Incidentally, the transmissivity characteristics of this figure are obtained as the result of forming the laminate composed of the dielectric mirrors A and B or the dielectric mirror C on the glass substrate and measuring the optical density corresponding to the laminate composed of the dielectric mirrors A and B or to the dielectric mirror C in the air.

In case of the second embodiment of FIG. 2(A), a-Si:H photoconductive film 3 having a thickness of 20 μm, which is doped with boron (B) of 0.3 ppm, is first formed on the glass substrate 1, on which an ITO film is also formed as the transparent electrode 2, by performing a CVD method. Further, a dielectric mirror A is formed by stacking six pairs of alternate $SiO_2$ film (a-1) and Si film (a-2), each of which is $\lambda/4$ (incidentally, $\lambda=710$ nm) in optical thickness, on the photoconductive film 3 as illustrated in FIG. 2(B). Further, let n denote the refractive index of each of the $SiO_2$ film (a-1) and the Si film (a-2). The thickness t of each of these films is obtained by the following equation: $t=\lambda/(4n)$. Moreover, another dielectric mirror B is formed by stacking three pairs of alternate $SiO_2$ film (b-1) and Si film (b-2), each of which is $\lambda'/4$ (incidentally, $\lambda'=540$ nm), on the top Si film (a-2), as viewed in this figure. Furthermore, a dielectric mirror C is formed on the dielectric mirror B by stacking two pairs of alternate $SiO_2$ film (c-1) and $TiO_2$ film (c-2), each of which is $\lambda'/4$ (incidentally, $\lambda'=540$ nm), thereon as also viewed in this figure. Finally, a reflection film is made up by adding a $SiO_2$ film d, the optical thickness of which is $\lambda'/2$ (incidentally, $\lambda'=540$ nm), onto the top $TiO_2$ film (c-2). Incidentally, each of $SiO_2$ and $TiO_2$ films is formed by effecting the oxygen ion beam assisted vaporization method. Further, the film forming rate of a $SiO_2$ film and that of a $TiO_2$ film are 10 Å/s and 1 Å/s, respectively. Moreover, the forming of the Si film is effected by performing a vacuum deposition method under an oxygen-gas pressure of $2\times10^{-6}$ Torr. Furthermore, the film forming rate of a Si film is 3 Å/s. Additionally, the temperature of the substrate at the time of measuring these film forming rates is a room temperature.

Then, similarly as in case of the first conventional spatial light modulator, the spatial light modulator of FIG. 2(A) is finished by using the glass substrate 1, on which the transparent electrode 2, the photoconductive film 3, the dielectric mirrors A, B and C and the $SiO_2$ film d are thus formed serially.

The dielectric mirrors A and B of alternate $SiO_2$ film and Si film have optical absorbency in addition to reflectivity, while the dielectric mirror C of pairs of alternate $SiO_2$ film and $TiO_2$ film has a large reflectivity but hardly has optical absorbency.

Figures 7, 8:
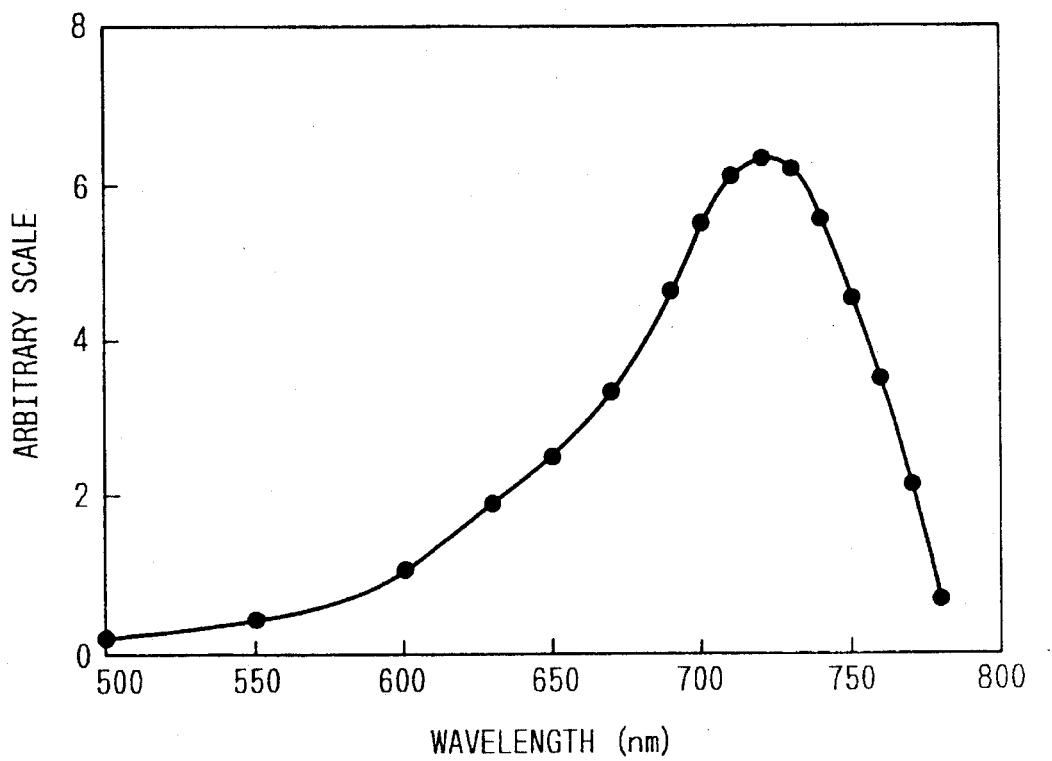
FIG. 7 is a table for describing the relations among the thicknesses of the photoconductors, the resolutions and the contrast ratios of the first and second embodiments of the present invention and the conventional spatial light modulators.
FIG. 8 is a graph for illustrating a typical sensitivity characteristic of a photoconductor made of a-Si:H.

Referring next to FIG. 7, there are shown the characteristics of the first and second embodiments of the present invention and the conventional spatial light modulators, for making comparisons thereamong. Incidentally, write light emitted from a light emitting diode (LED) has a wavelength of 700 nm and also has what is called the writing power of 50 micro-watts ($\mu$W)/cm$^2$. Further, read light is provided by filtering 250-watt xenon light (namely, light emitted by a 250-watt xenon lamp) a bandpass filter, the transmission band of which has the center frequency of 540 nm and the half-value width of 90 nm. Moreover, in these cases, the driving frequency is 3 kilo-hertz (kHz). Further, the contrast ratio of FIG. 7 is expressed by a ratio of the luminance of read light at the time when write light is on to the luminance (hereunder sometimes referred to as the dark level) of read light at the time when write light is off. Additionally, a modification (incidentally, the structure thereof is not shown) of the first conventional spatial modulator (namely, the first conventional device) of FIG. 7 has a similar structure as the first conventional spatial modulator does, except that the thickness of the photoconductive film is 25 $\mu$m.

As can be seen from FIG. 7, both of the first and second embodiments of the present invention have good resolutions and contrast ratios. Incidentally, in case of the second embodiment, an observed luminance is approximately 10 percent higher than the luminance observed in case of the first embodiment. This is because of the fact that the reflectivity of the second embodiment corresponding to read light is higher than that of the first embodiment corresponding to read light. However, as is seen from this figure, the contrast ratio observed in case of the first embodiment is equal to that observed in case of the second embodiment. This is because the dark level observed in case of the second embodiment is increased in comparison with that observed in case of the first embodiment at the same rate as of the increase in luminance.

In contrast, in case of the second conventional spatial light modulator (namely, the second conventional device), the resolution is good but there is a large reduction in contrast ratio, as compared with the cases of the embodiments of the present invention. This is due to the facts that unnecessary light included in the read light can not be eliminated completely on account of the characteristics of the bandpass filter, that the intensity of the read light itself is very large and that thus transmission light having a wavelength close to that of write light acts on the photoconductive film 3 to raise the dark level.

Further, in case of the first conventional spatial light modulator, as tile result of having the light shielding film 4, there is no influence of leakage of read light. However, the sensibility becomes low, so that the luminance does not increase so much. Thus both of the contrast ratio and the resolution are reduced in comparison with the cases of the embodiments of the present invention.

In contrast with this, if the thickness of the photoconductive film 3 is increased as in case of the modification of the first conventional spatial light modulator, the contrast ratio is improved but the resolution is further lowered.

The photoconductor made of a-Si:H has a high sensitivity to a light in a range from red to near-infrared as shown in FIG. 8, in which a typical sensitivity characteristic of a-Si:H is illustrated, and a light in such range is used as the write light. Therefore, the additional dielectric mirror in the present invention is designed to reflect (and preferably absorb) lights having wavelengths of about 600 to 700 nm in such range which lights are superfluously included in the read light.

Incidentally, in cases of the first and second embodiments of the present invention, Si/SiO$_2$ films are used as the dielectric mirrors. The dielectric mirrors of the present invention are not limited thereto. Namely, Si$_x$Ge$_{1-x}$SiO$_2$ dielectric mirror and Ge$_x$(Al$_2$O$_3$)$_{1-x}$/SiO$_2$ dielectric mirror, which have larger optical absorbency, SiO$_2$/TiO$_2$ dielectric mirrors or the like may be employed in the spatial light modulator of the present invention. Moreover, the present invention can be applied to a spatial light modulator having a light shielding film. In such a case, the thickness of the light shielding film can be reduced.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A spatial light modulation device having light writing means, a photoconductor, reflection means and a light modulator, the reflection means having a first dielectric mirror, information being written to the photoconductor by the light writing means, the reflection means reflecting read light which is incident on the light modulator, the spatial light modulation device further comprising:

a second dielectric mirror with a film having a layer thickness of a quarter of a wavelength close to a wavelength of a write light incident on a first surface of the photoconductor and mounted on a surface of the photoconductor opposed to the first surface of the photoconductor, for reflecting lights having wavelengths near wavelengths of the write light.

2. The spatial light modulation device as set forth in claim 1, wherein the second dielectric mirror comprises a plurality of stacked pairs of alternate SiO$_2$ films and Si films, each of which has an optical thickness of $\lambda$/4 ($\lambda$: a wavelength close to a wavelength of write light), on the photoconductor, and wherein the first dielectric mirror comprises a plurality of stacked pairs of alternate SiO$_2$ films and Si films, each of which has an optical thickness of $\lambda'$/4 ($\lambda'$: a wavelength of read light), on the second dielectric mirror.

3. A spatial light modulation device having light writing means, a photoconductor, reflection means and a light modulator, the reflection means having a first dielectric mirror, information being written to the photoconductor by the light writing means, the reflection means reflecting read light which is incident on the light modulator, the spatial light modulation device further comprising:

a second dielectric mirror with a film having a layer thickness of a quarter of a wavelength close to a wavelength of a write light incident on the photoconductor, for reflecting lights having wavelengths near the write light; and a third dielectric mirror adjoining to the light modulator for reflecting the read light.

4. The spatial light modulation device as set forth in claim 3, wherein the second dielectric mirror comprises a plurality of stacked pairs of alternate SiO$_2$ films and Si films, each of which has an optical thickness of $\lambda$/4 ($\lambda$: a wavelength close to a wavelength of write light), on the photoconductor, and wherein the third dielectric mirror comprises a plurality of stacked pairs of alternate SiO$_2$ films and TiO$_2$ films, each of which has an optical thickness of $\lambda'$/4 ($\lambda'$: a wavelength of read light), on the second dielectric mirror, and wherein the first dielectric mirror comprises a plurality of stacked pairs of alternate $SiO_2$ films and Si films, each of which has an optical thickness of $\lambda/4$.

5. The spatial light modulation device as set forth in claim 3, wherein the first dielectric mirror has absorbency for the read light, the second dielectric mirror has an optical absorbency and a low transmittance correspondingly to wavelengths of visible light and near-infrared light, and the third dielectric mirror does not absorb light of the wavelength equal to that of read light.

6. The spatial light modulation device as set forth in claim 3, wherein said second dielectric mirror is next to said photoconductor.

* * * * *